Aug. 26, 1952     S. C. CARNEY     2,608,471
PROCESS FOR PRODUCING FINELY DIVIDED SULFUR
Filed May 23, 1949
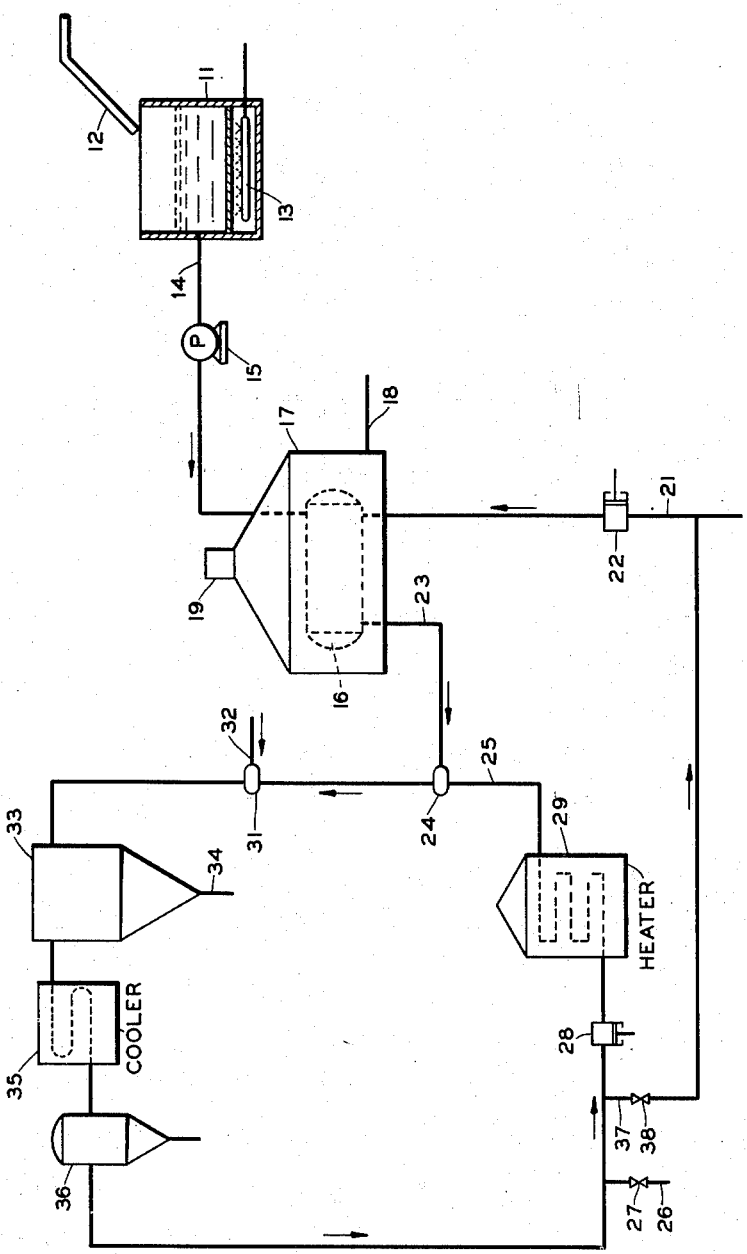
INVENTOR.
S. C. CARNEY
BY *Hudson and Young*
ATTORNEYS Patented Aug. 26, 1952

2,608,471

UNITED STATES PATENT OFFICE 2,608,471

PROCESS FOR PRODUCING FINELY DIVIDED SULFUR

Samuel C. Carney, Bartlesville, Okla., assignor to Phillips Petroleum Company, a corporation of Delaware Application May 23, 1949, Serial No. 94,850

12 Claims. (Cl. 23—224)

This invention relates to a method of processing sulphur. In one of its more specific aspects it relates to a method of producing finely divided sulphur. In another of its more specific aspects it relates to a method of producing finely divided sulphur by the dispersion of low viscosity molten sulphur.

Sulphur has long been used in various manufacturing and industrial processes. In many industries it is quite desirable to utilize the sulphur in a finely divided form. Conventional processes which have been devised for the production of finely divided sulphur are relatively expensive and inefficient. An example of the expensive and inefficient method of producing finely divided sulphur is the production of flowers of sulphur, which is a batch process. It is well known that batch operation is relatively more expensive and inefficient than continuous processes. Finely divided sulphur is also produced by grinding or milling solidified masses of sulphur. That type of operation requires expensive machinery and considerable power consumption.

Broadly speaking, this invention comprises the atomization of low viscosity molten sulphur into a heated normally gaseous hydrocarbon stream. The resulting sulphur-gas stream is cooled by the fine dispersion of a relatively cool fluid in the sulphur-gas stream. The atomized sulphur, when so cooled, is solidified and is removed from the gas stream by electrical precipitation. Production of finely divided sulphur in this manner may be carried on very efficiently as compared to conventional methods of producing such finely divided sulphur material.

An object of this invention is to provide a method for producing finely divided sulphur. Another object of this invention is to produce finely divided sulphur from a low viscosity liquid phase. Another object of this invention is to provide a low temperature process for the production of finely divided sulphur. Another object of the invention is to provide an improved method for producing insoluble sulphur. Another object of the invention is to produce an efficient method for producing finely divided sulphur. Other and further objects and advantages will be apparent to one skilled in the art upon study of the accompanying disclosure.

A better understanding of the invention will be obtained upon reference to the accompanying drawing which is a diagrammatic representation of an apparatus and flow plan which is utilized in the process of this invention.

Referring particularly to the drawing, tank 11 is provided so as to receive crude sulphur from conveyor conduit 12 which communicates between tank 11 and a sulphur supply source, not shown. Heater 13 is provided adjacent the lower portion of tank 11 and provides heat for the purpose of melting the crude sulphur in tank 11. The molten sulphur is removed from tank 11 by means of conduit 14 which has pump 15 positioned therein for the purpose of supplying the necessary pressure to move the molten sulphur from tank 11 to tank 16. Tank 16 is positioned within furnace 17 and is heated within furnace 17 by burning fuel which is supplied to furnace 17 through fuel inlet conduit 18. Effluent materials are removed from furnace 17 through stack 19. Normally gaseous hydrocarbon material is conveyed from a hydrocarbon source, not shown, by means of conduit 21, through compressor 22 positioned therein, to tank 16. The molten sulphur within tank 16 is placed under a pressure of at least 75 pounds and preferably under a pressure of at least 100 pounds per square inch. The molten sulphur within tank 16 is heated to a temperature at which its viscosity is quite low.

The low viscosity molten sulphur is removed from tank 16 through conduit 23 and is passed into header member 24 which at least partially surrounds conduit 25. Conduit 25 is provided with conduit 26 having valve 27 positioned therein. Conduit 26 may be utilized as an inlet or an outlet conduit. Normally gaseous hydrocarbon material is injected into line 25 through conduit 26 and is conveyed by conduit 25 to compressor 28, in which the pressure of the hydrocarbon material within line 25 is raised to such a point that the pressure energy can be converted to high velocity. Heater 29 is provided in conduit 25, preferably at a point downstream of compressor 28. The hydrocarbon material is heated in heater 29 so as to raise the temperature of the hydrocarbon material to a temperature above the melting point of sulphur, but preferably not materially above the temperature of the molten sulphur. The heated gaseous hydrocarbon material is passed at a high velocity which is sufficient to produce turbulent flow, i. e., a Reynolds number of about 3000 or greater, through the conduit section 25 which is surrounded by header member 24. Very fine droplets of the molten sulphur are injected into the hydrocarbon stream in conduit 25 and are atomized by the high velocity gas so as to greatly disperse the sulphur material in the high velocity heated gas stream. A relatively cool cooling fluid from a source not shown is conveyed to header member 31 through conduit member 32. The cooling fluid is injected into conduit 25 as a fine spray in sufficient volume to cool the sulphur-gas stream and to chill the finely dispersed sulphur material therein. The sulphur-gas stream is passed through an electrical precipitator 33, such as a Cottrell precipitator, in which finely divided sulphur material which has been solidified by the cooling action of the cooling fluid stream is removed from the gas stream. The finely divided sulphur material is removed from the bottom of precipitator 33 through conduit member 34.

A liquefied normally gaseous hydrocarbon, such as butane or propane, is very satisfactory for utilization as the cooling fluid. In some situations, however, I utilize water as the coolant. When water is used, it is desirable to remove as much of the water as possible from the gaseous hydrocarbon stream before it is returned to the atomization point. Cooler 35 is provided in conduit 25 downstream of electrical precipitator 33. The hydrocarbon stream is passed through cooler 35 wherein it is cooled so as to condense water vapors therein. Drop-out chamber 36 is provided in conduit 25 downstream of cooler 35 for the purpose of removing condensed water from the normally gaseous hydrocarbon stream. The gas stream is then recycled to compressor 28 where it once again passes through the above described cycle. When a normally gaseous hydrocarbon is utilized as the cooling medium, the same hydrocarbon material is utilized as the atomization or carrier stream in conduit 25. When normally gaseous hydrocarbon is added as a cooling fluid it is necessary to remove a portion of the gas from conduit 25. A portion of the gas may be removed from conduit 25 through conduit 37 and valve 38 and passed to conduit 21 as a portion of the pressurizing gas for tank 16.

The pressurizing gas is preferably added to the lower portion of tank 16 so as to entrain as much as possible of the gaseous material in the molten sulphur. The portion of the entrained gas aids in the atomization of the liquid sulphur material upon injection into the dispersing stream.

Sulphur material which is heated to its lowest viscosity is easily dispersed by the atomization and dispersing steps of this invention. The particles of finely divided sulphur which are formed generally range in size below three microns. Finely divided sulphur material may be produced by the method of this invention at a relatively low temperature. When heated to a temperature between 285° F. and 316° F. the sulphur material reaches a viscosity of below eight centipoises. The sulphur material is preferably heated to a temperature of between 295° F. and 310° F. at which a first minimum sulphur viscosity is obtained at the low temperatures. In such a state, the liquid material is easily atomized and dispersed by the action of the high pressure gas stream flowing rapidly past the jet injection points which are provided for sulphur injection into that stream. The sulphur material which is produced by this low temperature method is in the form of monoclinic sulphur. Monoclinic sulphur is called soluble sulphur for it is soluble in carbon disulphide. In some instances it may be desirable to produce finely divided sulphur which is to a large extent not soluble in carbon disulphide. The process of this invention is easily modified so as to also produce that type of sulphur. It is necessary only to increase the temperature of the sulphur within tank 16 to a point between 680° F. and the boiling point of the sulphur at operating conditions. Between those temperatures the sulphur material once again reaches a low viscosity. In other details, the process of this invention remains the same. The insoluble sulphur, well known as amorphous sulphur, tends to revert to the soluble form of sulphur at low storage temperatures. Such reversion is greatly increased when the sulphur material is contacted with water before it solidifies. For that reason, water is generally not utilized as the cooling fluid in the production of insoluble finely divided sulphur. The reversion of the insoluble form of sulphur to the soluble form is greatly retarded by contacting the sulphur with a halogen or halogen providing material. The halogens which are suitably utilized for this stabilization step are chlorine and bromine. The chlorine and bromine tend to remove small amounts of water from the sulphur and in that manner slow the reversion of the insoluble material. Ordinarily it is not necessary to utilize over 1 per cent by weight of the halogen in the atomizing gas.

When the amount of gaseous hydrocarbon within line 25 becomes too great, a further portion of the hydrocarbon material is removed through conduit 26. The removed hydrocarbon may be passed through carbon disulphide to remove any entrained sulphur material therefrom and then passed to the hydrocarbon supply source for storage. On the other hand, if the gaseous hydrocarbon material is the same as that which is being utilized for the cooling fluid, which is ordinarily the case, the portion of gaseous material which is removed from line 25 is passed to a compression zone, not shown, where it is compressed and cooled to a liquid state and is utilized as the cooling fluid.

Much of the pressurizing gas which is added to the lower portion of tank 16 is dissolved in the molten sulphur therein. When the molten sulphur material is injected into the dispersing gas stream, the dissolved gas aids in the dispersal of finely divided sulphur droplets and also aids in cooling the finely dispersed sulphur droplets by the expansion and concomitant cooling of the gas which is released from solution.

The finely divided sulphur droplets formed by atomization of the molten sulphur are carried by the dispersing gas stream to the point of cooling without substantial vaporization of the liquid particles. The cooling fluid shock cools the sulphur in a liquid state so as to solidify the sulphur from that liquid state.

Other and further modifications of this invention will be apparent to those skilled in the art upon study of this disclosure. Such modifications are believed to be within the spirit and the scope of the disclosure of this invention.

I claim:

1. A process for the production of finely divided sulphur which comprises the steps of placing low viscosity molten sulphur at a temperature below its boiling point under operating conditions, under pressure; injecting said sulphur as a fine liquid spray of highly dispersed droplets directly into a high velocity gas stream which is at a temperature above the melting point of sulphur and which is flowing at a Reynolds number of at least 3000; injecting a cooler fluid into said sulphur-gas stream so as to cool said sulphur-gas stream and to chill and solidify said highly dispersed droplets of sulphur; and separating said sulphur from the other materials in said stream.

2. A process for the production of finely divided sulphur which comprises the steps of heating sulphur to between 285° F. and 316° F., whereby said sulphur is converted to a molten state; placing said molten sulphur under a pressure of at least 75 pounds per square inch; injecting said sulphur as a fine liquid spray of highly dispersed droplets directly into a stream of normally gaseous hydrocarbon material flowing at a Reynolds number of at least 3000, said gas being at a temperature above the melting point of sulphur; injecting a cooler fluid into said sulphur containing-gas stream so as to cool said sulphur-gas stream and to crystallize said highly dispersed droplets of sulphur; and separating said sulphur from the other materials in said stream.

3. The process of claim 2, wherein said cooler fluid is water.

4. A process for the production of finely divided sulphur which comprises the steps of heating sulphur to between 285° F. and 316° F., whereby said sulphur is converted to a molten state; injecting a first portion of a normally gaseous hydrocarbon material into said molten sulphur so as to disperse at least a portion of said hydrocarbon material therein and to place said sulphur under a pressure of at least 100 pounds per square inch; injecting said sulphur-hydrocarbon mixture as a fine liquid spray of highly dispersed sulphur droplets directly into a stream of a second portion of said normally gaseous hydrocarbon material flowing at a Reynolds number of at least 3000, said second gas portion being at substantially the temperature of said molten sulphur; injecting a third portion of said normally gaseous hydrocarbon material into said sulphur-containing hydrocarbon gas stream as a fine liquid spray so as to cool said sulphur-gas stream and to crystallize said highly dispersed droplets of sulphur; and separating said sulphur crystals from the other materials in said stream.

5. A process for the production of finely divided sulphur which comprises the steps of heating sulphur to between 295° F. and 310° F., whereby said sulphur is converted to a low viscosity molten state; injecting a first portion of a normally gaseous hydrocarbon material into said molten sulphur so as to disperse at least a portion of said hydrocarbon material therein and to place said sulphur under a pressure of at least 100 pounds per square inch; injecting said sulphur-hydrocarbon mixture as a fine liquid spray of highly dispersed sulphur droplets directly into a stream of a second portion of said normally gaseous hydrocarbon material flowing at a Reynolds number of at least 3000, said second gas portion being at substantially the temperature of said molten sulphur; injecting a third portion of said normally gaseous hydrocarbon material into said sulphur-containing hydrocarbon gas stream as a fine liquid spray so as to cool said sulphur-gas stream and to crystallize said highly dispersed droplets of sulphur; and separating said sulphur crystals from the other materials in said stream.

6. The process of claim 5, wherein said sulphur-containing gas stream is passed through an electrical precipitator wherein said sulphur crystals are separated from said gas stream.

7. The process of claim 5, wherein said second portion of said gas stream contains a material which supplies to said sulphur-containing stream a small amount of a halogen selected from the group consisting of chlorine and bromine.

8. The process of claim 5, wherein at least a portion of said first portion of normally gaseous hydrocarbon material is dissolved in said molten sulphur.

9. A process for the production of finely divided sulphur which comprises the steps of heating sulphur to between 285° F. and 316° F., whereby said sulphur is converted to a low viscosity molten state; placing said molten sulphur under a pressure of at least 75 pounds per square inch; injecting said sulphur as a fine liquid spray of highly dispersed droplets directly into a stream of normally gaseous hydrocarbon material flowing at a Reynolds number of at least 3000, said gas being at substantially the temperature of said molten sulphur; injecting a fine spray of water into said sulphur containing-gas stream so as to cool said sulphur-gas stream and to crystallize said highly dispersed droplets of sulphur; separating unvaporized water from said stream; and passing said sulphur-gas stream through an electrical precipitator so as to precipitate said sulphur crystals therefrom.

10. A process for the production of finely divided sulphur which comprises the steps of heating sulphur to between 680° F. and the boiling point of said sulphur under operating conditions, whereby said sulphur is converted to a low viscosity molten state; placing said molten sulphur under a pressure of at least 75 pounds per square inch; injecting said sulphur as a fine liquid spray of highly dispersed droplets directly into a stream of a first portion of normally gaseous hydrocarbon material flowing at a Reynolds number of at least 3000, said gas being at a temperature above the melting point of sulphur; injecting a second portion of said normally gaseous hydrocarbon material into said sulphur containing-gas stream as a fine liquid spray so as to shock cool said sulphur-gas stream and to chill and solidify said highly dispersed droplets of sulphur; and separating said sulphur from the other materials in said stream.

11. The process of claim 10, wherein said second portion of said gas stream contains a material which supplies to said sulphur-containing stream a small amount of a halogen selected from the group consisting of chlorine and bromine.

12. A process for the production of finely divided sulphur which comprises the steps of placing low viscosity molten sulphur at a temperature below its boiling point under operating conditions, under pressure of at least 75 pounds per square inch; injecting said sulphur as a fine spray directly into a high velocity gas stream which is at a temperature above the melting point of sulphur and which is flowing at a Reynolds number of at least 3000; injecting a cooler fluid into said sulphur-gas stream so as to cool said sulphur-gas stream and to chill and solidify said sulphur; and separating said sulphur from the other materials in said stream.

SAMUEL C. CARNEY.

REFERENCES CITED

The following references are of record in the file of this patent:

UNITED STATES PATENTS

| Number | Name | Date |
|---|---|---|
| 359,164 | Lightner | Mar. 8, 1887 |
| 1,859,992 | Seil | May 24, 1932 |
| 1,992,611 | Grindrod | Feb. 26, 1935 |
| 2,330,934 | Thacker | Oct. 5, 1943 |
| 2,413,714 | Keeling | Jan. 7, 1947 |
| 2,460,365 | Schallis | Feb. 1, 1949 |